Jan. 2, 1951     L. B. GREEN     2,536,738
METAL BENDING AND STRETCHING APPARATUS WITH
ROTATABLE AND SHIFTABLE DIE SUPPORT
Filed March 11, 1948     4 Sheets-Sheet 1

INVENTOR.
BY LEE B. GREEN
Kwis, Hudson, Boughton & Williams
ATTORNEYS

Jan. 2, 1951 L. B. GREEN 2,536,738
METAL BENDING AND STRETCHING APPARATUS WITH
ROTATABLE AND SHIFTABLE DIE SUPPORT
Filed March 11, 1948 4 Sheets-Sheet 2

INVENTOR.
LEE B. GREEN
BY Kwis, Hudson,
Boughton & Williams
ATTORNEYS

Jan. 2, 1951 L. B. GREEN 2,536,738
METAL BENDING AND STRETCHING APPARATUS WITH
ROTATABLE AND SHIFTABLE DIE SUPPORT
Filed March 11, 1948 4 Sheets-Sheet 3

INVENTOR.
LEE B. GREEN
BY
Kwis, Hudson, Boughton & Williams
ATTORNEYS

Jan. 2, 1951  
L. B. GREEN  
2,536,738  
METAL BENDING AND STRETCHING APPARATUS WITH  
ROTATABLE AND SHIFTABLE DIE SUPPORT  
Filed March 11, 1948  
4 Sheets-Sheet 4

INVENTOR.  
LEE B. GREEN  
BY Kwis, Hudson,  
Boughton & Williams  
ATTORNEYS

Patented Jan. 2, 1951

2,536,738

UNITED STATES PATENT OFFICE 2,536,738

METAL BENDING AND STRETCHING APPARATUS WITH ROTATABLE AND SHIFTABLE DIE SUPPORT

Lee B. Green, Lakewood, Ohio

Application March 11, 1948, Serial No. 14,273

25 Claims. (Cl. 153—40)

This invention relates to bending machines and, more particularly, to an improved bending machine for forming elongated metal workpieces of various cross-sections, including workpieces having web and flange portions, to desired shapes without incurring wrinkling or buckling of the metal at the location of the bend and with substantially no spring-back effect when the bend has been completed.

As is understood by those skilled in this art, bending machines have been used heretofore in which the workpiece is bent to the desired shape by forming or wrapping the same around a die member. In some of those machines the metal of the workpiece is purposely subjected to stretching during the bending operation. Moreover, bending machines of this kind have been proposed in which the bending die is carried by a rotary table. So far as I am aware, however, the rotary-table bending machines of this type which have been proposed heretofore have been slow, cumbersome and inaccurate in operation and not at all suitable for present day production methods in which it is essential that the bending operations be carried out in a consistently accurate manner and at a rapid rate and that the operator be able to insert and remove the workpieces with ease and rapidity.

It is, therefore, an object of this invention to provide an improved bending machine of the character indicated in which the bending of elongated workpieces can be carried out with consistent accuracy and a rapid rate and in which the workpieces can be easily and rapidly inserted into or removed from the machine.

Another object is to provide an improved bending machine of this character in which the bending die is carried by a die support having both rotary and translatory movement.

A further object of the present invention is to provide an improved bending machine of the kind indicated in which the rotary movement of the die support can be controlled so as to cause a desired stretching of the workpiece during the bending operation.

Still another object of this invention is to provide an improved bending machine in which the rotary movement of the die support is produced by gear means rendered effective by the translatory movement of such die support.

As another of its objects, this invention provides a combined bending and stretching machine in which the gear means for producing the rotary movement of the die support includes a rack, or the like, which is adapted to be moved so as to accelerate or retard the rotary movement for controlling the stretching of the workpiece during the bending operation.

Yet another object is to provide an improved bending machine having a bending die mounted for simultaneous rotary and translatory movement to cause bending, or bending and stretching, of a workpiece by a wrapping of the workpiece around the bending dies and in which novel means is employed for holding the workpiece during the operation.

As a further object, this invention provides a bending machine of the rotary-table type in which the workholding means includes a chuck which is mounted for rotation and for lateral swinging so as to be capable of adjusting itself to different positions assumed by the workpiece during the bending operation and in which the chuck is also longitudinally adjustable to a desired setting.

A further object is to provide a combined bending and stretching machine in which a power device is employed to produce the longitudinal movement of the rotary die support and in which a second power device for imparting movement to the rack is adapted to be individually controlled so that the rack accelerates or retards the rotary movement of the die support for controlling the amount of stretching to be produced in the workpiece.

The invention can be further briefly summarized as consisting in certain novel combinations and arrangements of parts hereinafter described and particularly set out in the claims hereof.

Figure 1:
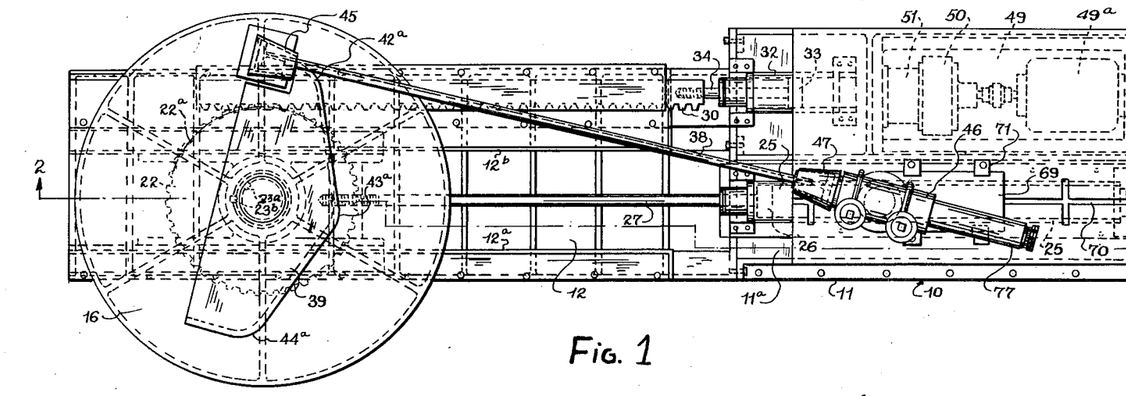
Fig. 1 is a top plan view of a bending machine embodying the present invention.
Figure 2:
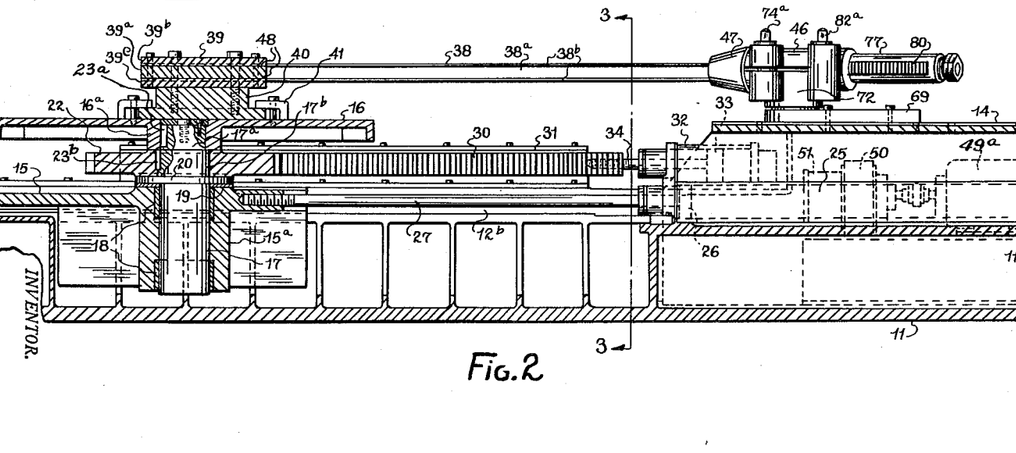
Fig. 2 is a vertical section taken longitudinally through the machine as indicated by line 2—2 of Fig. 1.
Figures 3, 4, 5, 13:
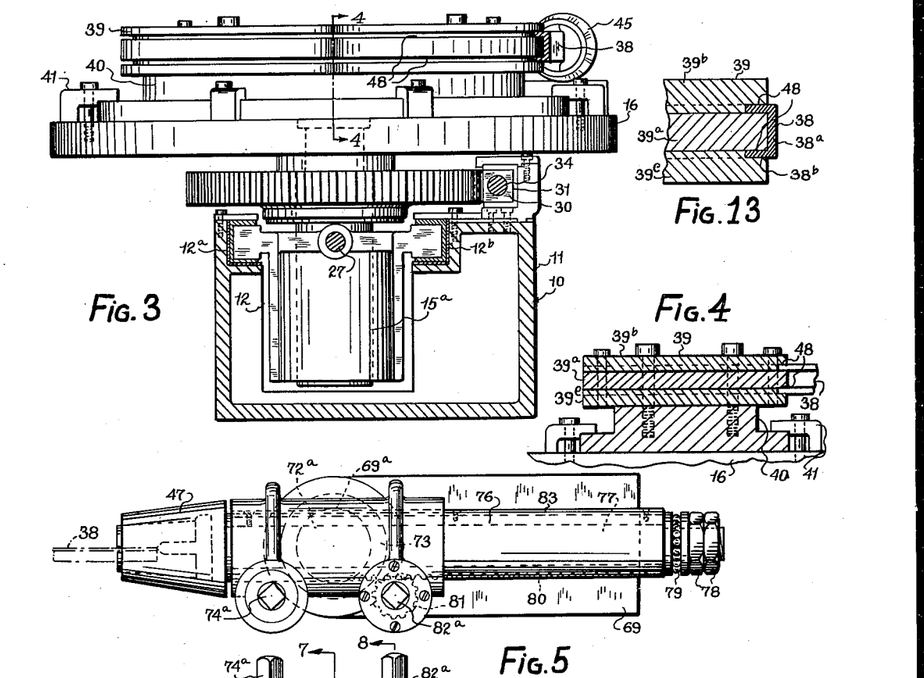
Fig. 3 is a vertical section taken transversely through the machine as indicated by line 3—3 of Fig. 2.
Fig. 4 is a fragmentary vertical section taken through the bending die as indicated by line 4—4 of Fig. 3.
Fig. 5 is a plan view of the workholder in detached relation and on a larger scale.
Fig. 13 is a partial vertical section, on a larger scale, taken through the bending die and workpiece as indicated by line 13—13 of Fig. 10.
Figure 6:
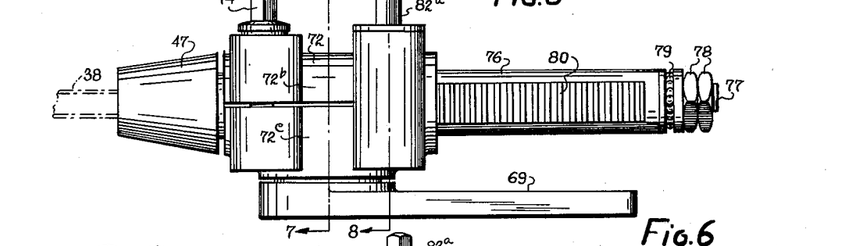
Fig. 6 is a side elevation of the workholder.

In the embodiment of the invention illustrated in Figs. 1, 2 and 3, a bending machine 10 is shown having a laterally elongated frame 11. The frame is provided with a pair of substantially parallel laterally spaced guide members 12a and 12b defining a longitudinally extending guideway 12. At one end of the machine the frame 11 is provided with a relatively elevated housing portion 13, the top of which defines a substantially horizontally extending fixed table 14, and a hollow portion 11a which extends into the housing portion 13 in spaced relation to and beneath the table 14. A carriage 15 is reciprocably movable in the guideway 12 toward and from the fixed table 14. A rotary die support in the form of a substantially circular table 16 is mounted on the carriage 15 for movement longitudinally of the guideway 12 toward and from the fixed table 14.

For mounting the rotary die table 16 thereon the carriage 15 is provided with an upright sleeve portion 15a in which a vertical spindle 17 is rotatably mounted by means of suitable vertical bearings 18 and a horizontal thrust bearing 19. The spindle 17 is provided at an intermediate point with an integral flange or collar 20 adapted to bear against the thrust bearing 19 and is also provided at its upper end with a relatively reduced portion 17a on which the hub portions 16a of the rotary table 16 is secured as by means of the key 23a. Immediately below the portion 17a the spindle 17 is provided with a shoulder portion 17b on which a gear 22 is secured by means of the key 23b and serves a purpose which will be presently explained.

Movement is imparted to the carriage 15 longitudinally of the guideway 12 by means of a suitable power device, preferably a hydraulic cylinder 25, as shown in this instance. The cylinder 25 is located at one end of the guideway 12 and can be mounted on the frame portion 11a which extends beneath the fixed table 14. A piston 26 reciprocable in the cylinder 25 is operably connected with the carriage 15 by means of the rod 27. Conduits 28 and 29 (see Fig. 14) are connected with opposite ends of the cylinder 25 and by controlling the flow of pressure fluid through these conduits, as explained hereinafter, the power cylinder will cause movement of the carriage 15 through a working stroke in a direction toward the fixed table 14 and through a return stroke in a direction away from the fixed table.

Rotary movement is imparted to the die table 16 by cooperation of the gear 22 with a rack 30 which extends along the frame 11 in substantially parallel relation to the guideway 12. When the carriage 15 is moved through its working stroke toward the table 14 the gear 22 rolls on the rack 30 and drives the spindle 17 to thereby impart rotary movement to the die table 16. During the return movement of the carriage 15, the gear 22 rotates the table 16 in the opposite direction to return the same to its initial position. It will thus be seen that the rotary movement is imparted to the die table 16 by the gear members 22 and 30 simultaneously with the translatory movement which is imparted to the carriage 15 by the power cylinder 25.

The rack 30 is mounted on the frame 11 by being supported for endwise movement in a guideway 31. This endwise movement is for the purpose of controlling the rotary movement of the die table 16 and can be imparted to the rack 30 by means of a suitable power device, preferably a hydraulic cylinder 32 as here shown, having a piston 33 reciprocable therein and operably connected with the adjacent end of the rack by means of the rod 34. As shown in the drawings, the cylinder 32 can be mounted on the frame portion 11a which extends beneath the fixed table 14. Conduits 35 and 36 are connected with opposite ends of the power cylinder 32 and by controlling the flow of pressure fluid through these conduits, as hereinafter explained, the desired endwise movement can be imparted to the rack 30 for controlling the rotary movement of the die table 16.

For performing a desired bending operation on an elongated metal workpiece, such as the workpiece 38, a bending die 39 is mounted on the die table 16 as by means of a bolster plate 40 and suitable clamps 41. The workpiece 38 is initially a substantially straight channel-shaped metal member having longitudinal web and flange portions 38a and 38b as shown in Figs. 1 and 2. During the bending operation this workpiece is bent to substantially the U-shape form shown in Fig. 12 by forming three successive bends 42, 43 and 44 therein at spaced points longitudinally thereof. The formed workpiece thus produced may be a frame member intended for use in a motor vehicle, although various other specific workpieces can be subjected to desired bending operations in this machine to adapt them for use in various kinds of metal fabricating work.

During the bending operation performed on the workpiece 38, the die 39 rotates with the table 16 and is also moved longitudinally of the guideway 12 toward the fixed table 14 by the translatory movement imparted to the carriage 15. During such combined rotary and translatory movement, the workpiece 38 is wrapped around the die 39, thereby causing the die to form the successive bends 42, 43 and 44 in the workpiece. During this bending operation the workpiece is gripped at or adjacent its forward end by a suitable workholder, such as the chuck 45, and is also engaged at a point spaced from its forward end by a workholder 46 mounted on the fixed table 14 and which may include a chuck 47. The chucks 45 and 47 can be fluid operated chucks or can be of any other conventional type. The chuck 45 can be embodied in the bending die 39, or as here shown, can be mounted on the rotary table 16 adjacent the portion of the die which forms the first bend 42 in the workpiece. The workholder 46 will be further described hereinafter.

The die 39 can be of any appropriate size or shape depending upon the particular bending operations required to be performed on the workpiece. In this instance the die 39 has three convexly rounded portions 42a, 43a and 44a which form the respective bends 42, 43 and 44 in the workpiece when the latter is wrapped or wound about the die. The die is here shown as also having a pair of vertically spaced grooves 48 in the working face or edge thereof and in which the spaced longitudinal flanges 38b of the workpiece engage during the bending operation. Although the die 39 is here shown as being formed by three plate-like sections 39a, 39b and 39c, it could be of any other appropriate form of construction. During the bending operation the web portion 38a of the workpiece is bent out of its own plane in forming each of the three successive bends 42, 43 and 44 and during the formation of these same bends the flange portions 38b are bent within their own planes. Since the flange portions 38b engage snugly in the grooves 48 of the die 39 they will be held by the side walls of the grooves against wrinkling or buckling during the formation of the bends 42, 43 and 44.

The improved bending machine 10 can be used for carrying out simple bending operations on the workpiece 38 as already explained above and can also be used for carrying out a combined bending and stretching operation on the workpiece. When the workpiece is subjected to a stretching operation simultaneously with the bending thereof, important additional advantages are obtained in that the flange portions of the workpiece are less likely to become wrinkled or buckled at the location of the bend and the inherent spring-back effect frequently found in formed workpieces is substantially entirely eliminated. The stretching of the workpiece simultaneously with the bending thereof results, in part, from the offset location of that portion of the die which produces the bend, in relation to the rotation axis of the table 16. The amount of such stretching imparted to the workpiece during the bending thereof can be varied by controlling the rotary movement of the die table 16 by means of the longitudinal movement imparted to the rack 30.

In the case of the bending die 39, the amount of stretching imparted to the workpiece 38 by the die portions 42a, 43a and 44a in forming the bends 42, 43 and 44 is initially dependent upon the location of these die portions relative to the pitch circle 22a of the gear 22. The die portion 42a which produces the initial bend 42 is located outside of the pitch circle 22a and therefore this portion of the die will have a more rapid arcuate travel during rotation of the die table 16 than a point on the pitch circle and will ordinarily produce stretching in the workpiece simultaneously with the forming of this bend. The die portion 44a is likewise located on the table 16 at a point outwardly of the pitch circle 22a and will also ordinarily produce stretching of the workpiece simultaneously with the forming of the bend 44. The die portion 43a which forms the bend 43 is, however, located at a point on the die table 16 inwardly of the pitch circle 22a and therefore has a slower rate of arcuate travel during rotation of the table than a point on the pitch circle 22a, and hence, this portion of the die will ordinarily not produce any stretching of the workpiece during the forming of the bend 43.

To prevent the occurrence of an excessive amount of stretching in the workpiece 38 during the forming of bends 42 and 44 therein, endwise movement is imparted to the rack 30 in a direction to retard the rotary movement of the die table 16 during the bending operation, that is to say, endwise movement in a direction toward the fixed table 14. Since this inward movement of the rack 30 is in the same direction as the translatory movement being imparted to the carriage 15 by the power cylinder 25, the additive result is a decreased relative movement between the rack and the gear 22 and this causes a retardation of the rotary movement of the table 16. To increase the stretching imparted to the workpiece 38 during the forming of the bend 43 therein, an outward movement is imparted to the rack 30 and this outward movement being opposite to the direction of the translatory movement it produces an increased relative movement between the rack and gear 22 and results in an acceleration of the rotary movement of the die table 16.

Figure 9:
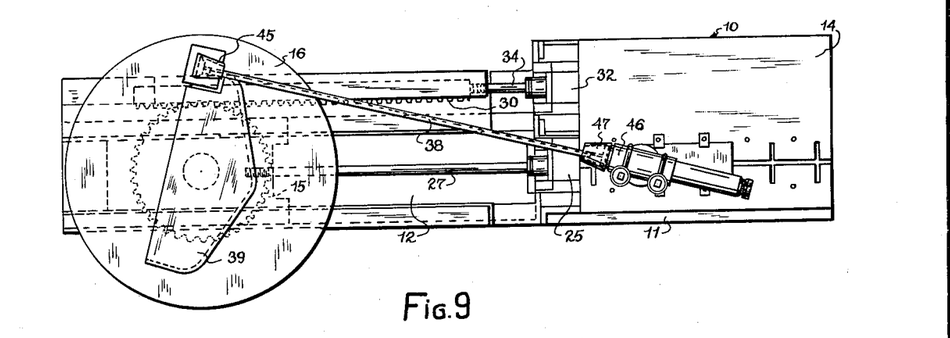
Figs. 9 to 12 inclusive, are plan views corresponding with Fig. 1 but somewhat diagrammatic in form and showing the different positions assumed by the bending die and workpiece at different stages of the bending operation.

Figs. 9 to 12 inclusive, show the machine 10 being used to carry out the above described combined bending and stretching operation on the workpiece 38 during which the three successive bends 42, 43 and 44 are formed therein by the bending die 39. Fig. 9 shows the carriage 15 and the rotary die table 16 located on the guideway 12 at a relatively remote point from the fixed table 14. The die 39 is shown in this view in its initial or starting position and at this time the workpiece 38 extends in relatively inclined relation to the guideway and has its ends gripped by the chucks 45 and 47. When the die and workpiece occupy the relative positions shown in Fig. 9, the machine is ready to start forming the initial bend 42 in the workpiece.

Figure 10:
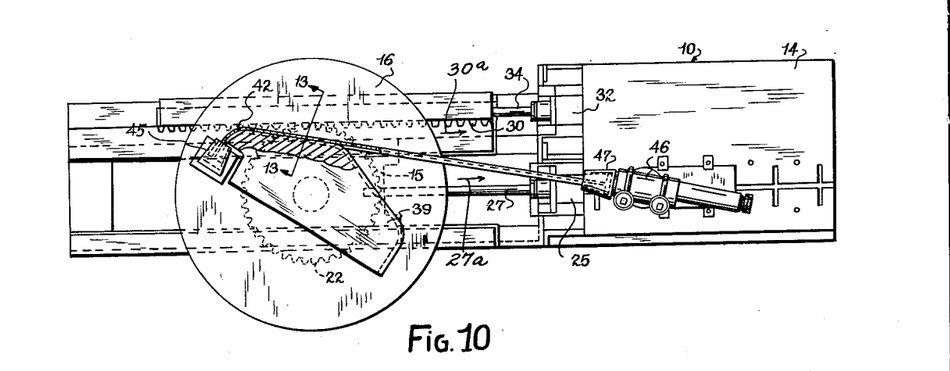

Fig. 10 shows the carriage 15 as having been moved through a portion of its working travel toward the fixed table 14 and also shows the die table 16 as having been rotated through a corresponding angular distance by the rolling of the gear 22 in mesh with the rack 30. During the combined translatory and rotary movement thus imparted to the table 16 during its travel from the position shown in Fig. 9 to the position shown in Fig. 10, the die portion 42a has completed the bend 42 in the workpiece and the die now occupies the position in which it is about to form the bend 43. During the forming of the bend 42, the workpiece was subjected to a combined bending and stretching operation, but to prevent excessive stretching of the workpiece by reason of the fact that the die portion 42a lies outside the pitch circle 22a, a simultaneous inward movement was imparted to the rack 30 by the power cylinder 32.

Figure 11:
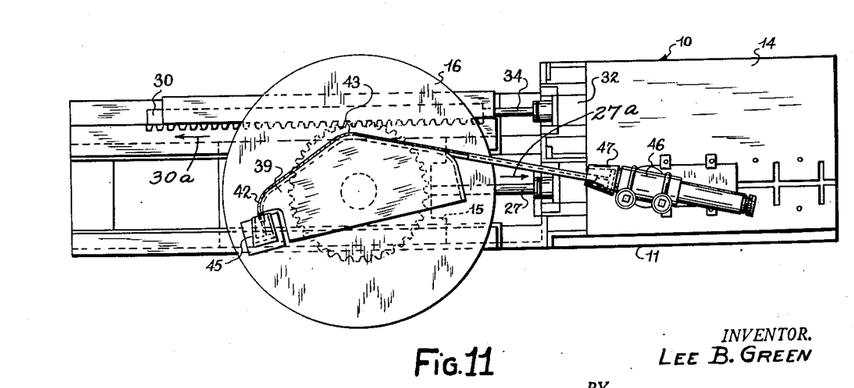

Fig. 11 shows the carriage 15 and the rotary table 16 as having been moved still farther toward the fixed table 14 and the die 39 is shown in the position in which the second bend 43 has been completed and the die portion 44a is about to begin forming the third bend 44. During the forming of the bend 43 the rack 30 has been moved in an outward direction to accelerate the rotary movement of the table 16 to thereby increase the stretching of the workpiece and compensate for the fact that the die portion 43a lies inside the pitch circle 22a.

Figure 12:
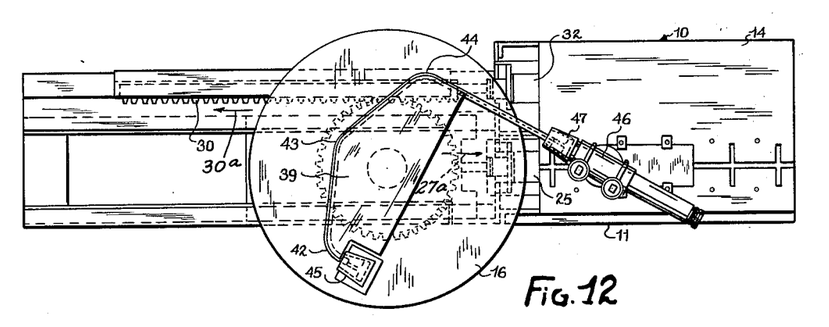

In Fig. 12 the carriage 15 and the rotary table 16 are shown in their final position, that is to say, in a position corresponding with the end of the working travel. At this time the position of the die 39 is such that the die portion 44a has completed the third bend 44 in the workpiece. During the forming of this third bend the rack 30 has again been moved in an inward direction to retard the rotary movement of the table 16 and thereby prevent an excessive amount of stretching from being produced in the workpiece.

Arrows 27a and 30a associated with the rod 27 and the rack 30 in Figs. 10, 11, and 12 show the direction of the relative movements of these members during the forming of the three bends 42, 43 and 44.

After the desired bends have been formed in the workpiece 38, as explained above, it is released from the chucks 45 and 47 and is removed from the machine. The power cylinder 25 is then operated to return the carriage 15 and rotary die table 16 to the initial or starting position shown in Fig. 9 ready to receive another workpiece. The power cylinder 32 is also actuated to return the rack 30 to the position corresponding with the initial position of the rotary table 16.

As mentioned above, the power cylinder 25 for actuating the carriage 15 and the power cylinder 32 for actuating the rack 30 are preferably hydraulic cylinders, and oil or other suitable liquid for operating these cylinders can be supplied under pressure from a suitable tank or reservoir 49 located in the hollow frame portion 11a. The fluid pressure for actuating the power cylinder 25 is derived from a suitable pump 50 and the fluid pressure for actuating the cylinder 32 is derived from a suitable pump 51. These pumps have appropriate fluid delivery capacities for the cylinders 25 and 32 and are adapted to be driven by an electric motor 49a. The pumps and driving motor are here shown as being mounted on the top of the tank 49.

Figure 14:
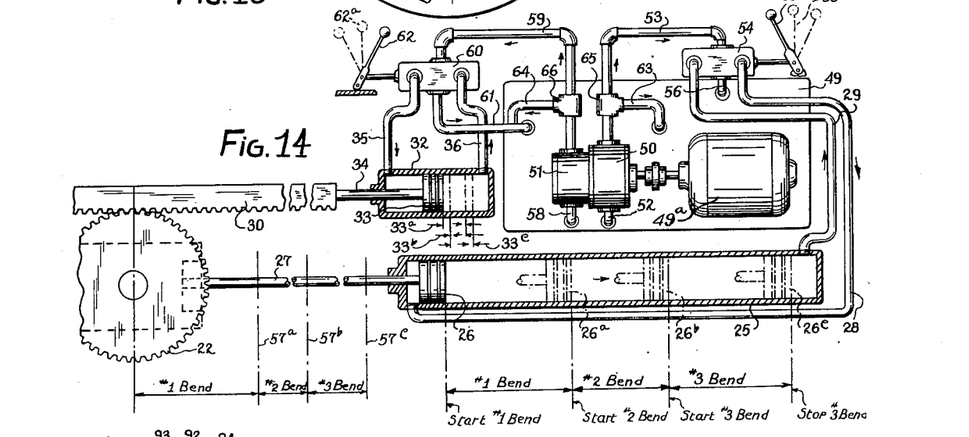
Fig. 14 is a plan view of a diagrammatic nature showing the controls and fluid pressure supply means for the power devices which produce the longitudinal movement and control the rotary movement, respectively.

The pump 50 withdraws liquid from the tank 49 through a suction conduit 52 and discharges the liquid under pressure through a delivery conduit 53 and control valve 54 for use by the power cylinder 25. Opposite ends of the power cylinder 25 are operably connected with the control valve 54 by the above-mentioned conduits 28 and 29. The control valve 54 is of a conventional construction and is provided interiorly thereof with a movable valve member (not shown) which is adapted to be shifted by a manually operable control lever 55 so that the pressure fluid delivered by the pump 50 will be supplied to one end or the other of the power cylinder 25 depending upon the direction in which the carriage 15 is to be moved. The valve 54 is also provided with an exhaust conduit 56 for returning fluid to the tank 49. The control lever 55 has an intermediate or neutral position 55a in which the pressure fluid is trapped in the cylinder 25 and can be shifted in either direction from this neutral position to cause a corresponding movement of the carriage 15. In Fig. 14 the different positions to which the piston 26 of the power cylinder 25 moves during the forming of the three bends 42, 43 and 44 in the workpiece 38, are indicated respectively at 26a, 26b and 26c. The corresponding positions to which the axis of the spindle 17 is moved are indicated by the lines 57a, 57b and 57c.

Liquid is withdrawn from the tank 49 by the pump 51 through the suction conduit 58 and is delivered under pressure through the conduit 59 and the control valve 60 for use by the cylinder 32 in imparting endwise movement to the rack 30. The control valve 60 is connected with opposite ends of the power cylinder 32 by the above-mentioned conduits 35 and 36 and also has an exhaust conduit 61 for returning fluid to the tank. The control valve 60 is similar to the valve 54 and is provided internally thereof with a movable valve member (not shown) which is adapted to be actuated by the manually operable control lever 62. The control lever 62 has an intermediate position 62a in which fluid is trapped in the power cylinder 32 and can be shifted in either direction from this neutral position for actuating the valve 60 to cause a corresponding endwise movement of the rack 30 by the power cylinder. The lengths of travel through which the piston 33 of the power cylinder 32 is moved in succession in producing the endwise movement of the rack 30 necessary to control the rotary movement of the die table 16 during the forming of the bends 42, 43 and 44 are indicated, respectively, by the dimensional distances 33a, 33b and 33c. When the control levers 56 and 62 of the valves 54 and 60 are in their neutral positions, the pressure fluid being delivered by the pumps 50 and 51 is returned to the tank 49 through the by-pass conduits 63 and 64 which lead from automatic by-pass valves 65 and 66 which are located in the delivery conduits 53 and 59 respectively, and which can be of any conventional construction.

Figure 7:
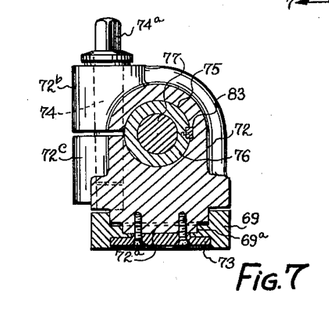
Figs. 7 and 8 are vertical sectional views taken through the workholder transversely thereof as indicated by section lines 7—7 and 8—8, respectively, of Fig. 6.
Figure 8:
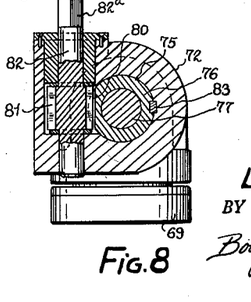

The workholder 46 which includes the chuck 47 and is mounted on the fixed table 14 is of a novel construction and will be described next. This workholder comprises a bracket 69 which is adapted to be mounted at different positions of adjustment on the fixed table 14, as afforded by the slots 70 and the clamps 71 of the latter, and a head 72 pivotally mounted on the bracket to permit lateral swinging of the chuck 47. This pivotal mounting can be formed by the head portion 72a (see Fig. 7) which is rotatably seated in a recess 69a of the bracket 69 and is retained therein by the bearing disk 73.

The head 72 has clamping portions 72b and 72c adapted to be drawn together by a clamping screw 74 having a non-circular portion 74a to which a wrench or other tool can be applied. The head 72 also has an opening 75 therethrough in which a sleeve 76 is slidable for longitudinal adjustment and is adapted to be clamped at a desired setting by the clamping portions 72b and 72c. A spindle 77 extends through the sleeve 76 and is rotatable therein. The chuck 47 is fixed on the forward end of the spindle 77 so as to be rotatable therewith and adjustable longitudinally with the sleeve 76. The opposite end of the spindle projects from the sleeve 76 and is provided with a shoulder which, in this instance, is formed by the nuts 78. An anti-friction thrust bearing 79 is disposed between the nuts 78 and the adjacent end of the sleeve 76.

From the construction of the workholder 46, as above described, it will be seen that during the bending operations performed on the workpiece 38 the chuck 47 is capable of self-adjustment by the lateral swinging afforded by the pivoted head 72 and by the rotary movement permitted for the spindle 77 in the sleeve 76. In this way the chuck 47 will always remain in alignment with the axis of the workpiece and the workpiece can assume different angular positions required by the bending die 39 and will always remain in substantially tangential relation to the working surface of the die.

The workholder 46 can be adjusted on the table 14 and the sleeve 76 can be adjusted in the head 72 so as to provide a setting for the chuck 47 which will be appropriate for a particular length of the workpiece 38. When the clamping screw 74 of the head 72 has been released for making the sleeve adjustment just mentioned, the sleeve can be shifted axially in the head by means of a rack 80 formed on the sleeve along one side thereof and a pinion 81 meshing with such rack. The pinion 81 is carried by a shaft 82 which is rotatable in the head 72 and has a non-circular portion 82a to which a wrench or other suitable tool can be applied. The rack 80 is maintained in mesh with the pinion 81 by preventing rotation of the sleeve 76 about its axis, as by means of the key 83 which is secured to the sleeve and is slidable in a keyway formed in the head 72 as a radial extension of the opening 75.

Figure 15:
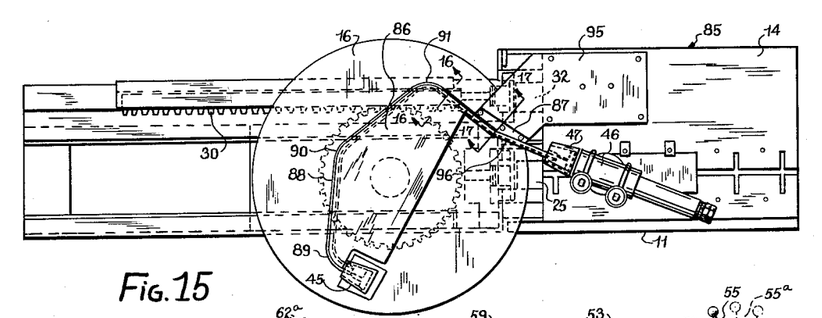
Fig. 15 is a plan view showing a modified form of the improved bending machine in which a stationary bending die is employed in addition to the movable bending die.
Figure 16:
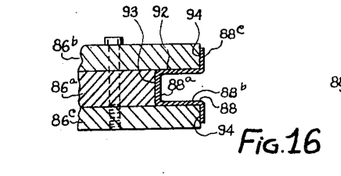
Fig. 16 is a partial vertical section taken through the movable bending die of the modified machine, the view being taken on line 16—16 of Fig. 15.
Figure 17:
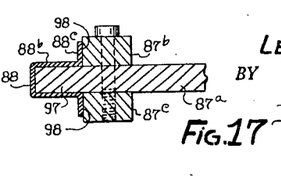
Fig. 17 is a similar vertical section taken through the stationary bending die as indicated by line 17—17 of Fig. 15.

In Figs. 15, 16 and 17 of the drawings a modified bending machine 85 is shown which is identical in construction and operation with the machine 10 described above except for the fact that the movable bending die 86 is of a different cross-sectional shape and the fact that the modified machine includes a stationary bending die 87 in addition to its movable bending die. The workpiece 88 is of a different cross-sectional shape than the workpiece 38 and for that reason the cross-sectional shape of the movable bending die 86 is different from the die 39. In this instance, the workpiece 88 is of a channel-shaped cross-section having web and flange portions 88a and 88b, but the longitudinally extending flange portions 88b also have angular longitudinal extensions or edge portions 88c lying in a plane which is substantially parallel to the plane containing the web portion 88a. Aside from the bending dies 86 and 87, the machine 85 is in other respects identical with the machine 10 described above and functions in the same manner to form three successive bends 89, 90 and 91 in the workpiece during a simultaneous rotary and translatory movement imparted to the die 86. Corresponding parts of the machine 85 have accordingly been designated with the same reference characters as in the machine 10.

The movable bending die 86 is shown in Fig. 16 as being formed by three connected sections 86a, 86b and 86c which define a peripheral groove 92 adapted to receive the channel-shaped portion of the workpiece 38. The edge of the intermediate die section 86a forms a working surface 93 against which the web portion 88a of the workpiece is bent and the edges of the top and bottom die sections 86b and 86c form peripheral working portions 94 against which the edge portions 88c of the workpiece are bent. Portions of the adjacent inner faces of the die sections 86b and 86c engage the flange portions 88b of the workpiece and hold the same against wrinkling or buckling during the bending operations.

The stationary die member 87 is mounted on the fixed table 14 by means of a suitable bracket 95, as shown in Fig. 15. The bracket 95 is of a size and shape to locate the die 87 in proper position to be engaged by an intermediate portion of the workpiece 88 to form a fourth and final bend 96 therein. The location of the die 87 is such that it will be engaged by the portion of the workpiece extending between the movable bending die 86, after the completion of the third bend 91, and the chuck 47 and will form the bend 96 in this portion of the workpiece.

The stationary bending die 17 may be composed of three connected sections, as shown in Fig. 17, which comprise an intermediate section 87a and top and bottom sections 87b and 87c. The intermediate section 87a projects beyond the top and bottom sections and forms a die portion 97 which is adapted to extend into the channel recess of the workpiece 88. The edges of the top and bottom die sections 87b and 87c form working surfaces 98 against which the longitudinal edge portions 88c of the workpiece are bent. The side faces of the die portion 97 engage the flange portions 88b of the workpiece and hold the same against wrinkling or buckling during the formation of the bend 96. Since the bend 96 is formed during the final part of the combined rotary and translatory movement being imparted to the movable bending die 86, the workpiece can, if desired, be subjected to stretching during the forming of this bend depending upon the control exercised over the rotary movement of the die table 16 by the endwise movement of the rack 30.

From the foregoing description and the accompanying drawings it will now be readily understood that this invention provides an improved bending machine of the rotary-table type in which elongated workpieces can be subjected to either a simple bending operation, or to a combined bending and stretching operation. It will also be seen that the movable bending die is actuated with a simultaneous rotary and translatory movement so that the workpiece is wrapped around the die during the forming operation. Moreover, it will be seen that the stretching to which the workpiece is subjected during the bending operation can be accurately controlled by accelerating or retarding the rotary movement imparted to the bending die. Additionally, it will be seen that the improved machine is adapted for carrying out rapid production work in which successive workpieces are subjected to consistently accurate forming operations and in which the workpieces can be easily and quickly inserted into or removed from the machine. The bending, or bending and stretching, operations as carried out in the improved machine are accomplished without wrinkling or buckling and with substantially no spring-back effect in the workpiece.

Although the improved bending machine has been illustrated and described herein to a detailed extent, it will be understood, of course, that the invention is not to be regarded as being correspondingly limited in scope, but includes all changes and modifications coming within the terms of the claims hereof.

Having thus described my invention, I claim:

1. In a bending machine, a frame, a chuck mounted on said frame at a relatively fixed location thereon and adapted to grip an elongated workpiece at a point spaced from its forward end, a die support, means mounting said die support for rotary movement and for a simultaneous translatory movement which advances said die support continuously toward said chuck during said rotary movement, a die on said die support about which said workpiece is adapted to be wrapped progressively from said forward end during said rotary and translatory movement to cause bending and stretching of the workpiece, and means for producing said rotary and translatory movement of the die support, said chuck being effective to substantially anchor said workpiece at the gripped point thereof to permit said stretching of the workpiece by the wrapping thereof on said die.

2. In a bending machine, a frame, a first chuck mounted on said frame at a relatively fixed location thereon and adapted to grip an elongated workpiece at a point spaced from its forward end, a die support, means mounting said die support for rotary movement and for a simultaneous translatory movement which advances said die support continuously toward said first chuck during said rotary movement, a second chuck on said die support adapted to grip the workpiece adjacent its forward end, a die on said die support and about which a portion of the workpiece intermediate said chucks is adapted to be wrapped during said rotary and translatory movement to cause bending and stretching of the workpiece, and means for producing said rotary and translatory movement of the die support, said first chuck being effective to substantially anchor said workpiece at the gripped point thereof to permit said stretching of the workpiece by the wrapping thereof on said die.

3. In a bending machine, a frame, chuck means on said frame adapted to grip and substantially anchor a workpiece, a die support, a carriage movable longitudinally of said frame and mounting said die support on said frame for rotary and longitudinal movement, a bending die on said die support and adapted to cause bending of the workpiece to the desired shape during said rotary and longitudinal movement by wrapping of the workpiece around said bending die, meshing gear members connected with said frame and die support and having rolling cooperation adapted to cause a continuous rotary movement of the die support during a continuous longitudinal movement of the carriage, and power means operable to cause said longitudinal movement of the carriage, said bending die having a bend-forming portion extending beyond the common pitch line of said meshing gear members and adapted to cause stretching of said workpiece during the bending thereof.

4. In a bending machine, a frame, a die support, chuck means for holding an elongated workpiece having web and flange portions, a carriage movable longitudinally of said frame and mounting said die support on said frame for simultaneous rotary and longitudinal movement, a bending die on said die support and about which said workpiece is adapted to be wrapped during said rotary and longitudinal movement to cause stretching of the workpiece and to also cause bending of the web portion out of its own plane and simultaneous bending of the flange portion within its own plane, said bending die having means for holding said flange portion to prevent buckling thereof during said bending, meshing gear members connected with said frame and die support and having rolling cooperation adapted to cause a continuous rotary movement of the die support during a continuous longitudinal movement of said carriage, and power means operable to cause said longitudinal movement of said carriage, said bending die having a bend-forming portion extending beyond the common pitch line of said meshing gear members and adapted to cause said stretching of the workpiece during said bending of said web and flange portions.

5. In a bending machine, a frame, a chuck on said frame adapted to grip and substantially anchor an elongated workpiece so that an end of the workpiece projects from the chuck, a die support, a carriage movable longitudinally of said frame and mounting said die support on said frame for rotary movement and also for longitudinal movement toward and away from said chuck, a bending die on said die support adapted to cause bending and stretching of the projecting end of said workpiece during said rotary and longitudinal movement, meshing gear members connected with said frame and die support and having rolling cooperation adapted to cause a continuous rotary movement of the die support during a continuous longitudinal movement of said carriage, and means for imparting said longitudinal movement to said carriage, said bending die having a bend-forming portion extending beyond the common pitch line of said meshing gear members and adapted to cause said stretching of the workpiece during said bending thereof.

6. In a bending machine, a frame, a carriage movable on said frame, a table rotatably mounted on said carriage, a bending die on said table and about which an elongated workpiece is adapted to be wrapped for bending the workpiece to a desired shape, means associated with said die for gripping one portion of the workpiece, means on said frame engageable with another portion of said workpiece for gripping and substantially anchoring the same, a rack on said frame, power means adapted to actuate said carriage, and a gear member connected with said table and meshing with said rack such as to cause rotary movement of said table during actuation of the carriage by said power means, said bending die having a bend-forming portion extending beyond the common pitch line of said meshing rack and gear members and adapted to cause stretching of the workpiece during said bending thereof.

7. In a machine for producing a combined bending and stretching operation on an elongated workpiece, a frame, means on said frame adapted to grip said workpiece at a point spaced from its forward end, a die support, means mounting said die support for rotary movement and for translatory movement toward the gripping means, means on said die support adapted to grip the workpiece adjacent its forward end, a die on said die support adapted to cause bending and stretching of the workpiece during said rotary and translatory movement, means for producing said rotary and translatory movement of the die support, and means for accelerating or retarding said rotary movement of the die support in relation to said translatory movement thereof for controlling the stretching of the workpiece.

8. In a bending machine, a frame, a die support, a means mounting said die support on said frame for rotary and longitudinal movement, a die on said die support and about which a workpiece is adapted to be wrapped during said rotary and longitudinal movement to cause bending of the workpiece, meshing gear members adapted to cause the rotary movement of said die support during said longitudinal movement, one of said gear members being connected with said die support and the other being mounted on said frame and adapted to be moved substantially in the direction of said longitudinal movement, power means operable to cause said longitudinal movement of the die support, and other power means operable to impart movement to said other gear member to cause acceleration or retardation of said rotary movement of the die support in relation to said longitudinal movement thereof.

9. In a combined bending and stretching machine, a frame, a die support, means mounting said die support on said frame for rotary and longitudinal movement, a die on said die support and about which an elongated workpiece is adapted to be wrapped during said rotary and longitudinal movement to cause bending and stretching of the workpiece, a chuck on said die support and movable therewith and adapted to grip one end of said workpiece, a second chuck mounted on said frame and adapted to grip said workpiece at a point spaced from said one end, meshing gear members adapted to cause the rotary movement of said die support during said longitudinal movement, one of said gear members being connected with said die support and the other being mounted on said frame and adapted to be moved substantially in the direction of said longitudinal movement, means operable to cause said longitudinal movement of the die support, and means for imparting movement to said other gear member for varying said rotary movement of the die support so as to control the stretching of the workpiece.

10. In a combined bending and stretching machine, a frame, a die support, a chuck on said die support for gripping one end of an elongated workpiece, a second chuck mounted on said frame and adapted to grip the workpiece at a point spaced from said one end, means mounting said die support on said frame so as to be capable of rotary movement and also longitudinal movement toward and away from said second chuck, a bending die on said support and about which said workpiece is adapted to be wrapped during said rotary and longitudinal movement to cause bending and stretching of the workpiece, a pair of meshing gear members adapted to cause the rotary movement of said die support during said longitudinal movement, one of said members being an arcuate gear member connected with said die support and the other being a rack mounted on said frame for endwise movement substantially in the direction of said longitudinal movement, means for imparting said longitudinal movement to the die support, and means for imparting endwise movement to said rack for varying the rotary movement of the die support so as to control the stretching of the workpiece.

11. In a combined bending and stretching machine, a frame, a die support, a chuck on said die support for gripping one end of an elongated workpiece having web and flange portions, a second chuck mounted on said frame and adapted to grip the workpiece at a point spaced from said one end, a carriage reciprocably movable longitudinally of said frame and mounting said die support on said frame so as to be capable of rotary movement and also longitudinal movement toward and away from said second chuck, a bending die on said support and about which said workpiece is adapted to be wrapped during said rotary and longitudinal movement to cause bending of the web portion out of its own plane and bending of the flange portion within its own plane and to also cause stretching of the workpiece, said bending die having means for holding said flange portion against buckling during the bending thereof, a pair of meshing gear members adapted to cause a continuous rotary movement of said die support during a continuous longitudinal movement of said carriage, one of said members being an arcuate gear member connected with said die support and the other being a rack mounted on said frame for endwise movement substantially in the direction of said longitudinal movement of the die support, means for imparting said longitudinal movement to said carriage, and means for imparting the endwise movement to said rack for varying the rotary movement of the die support so as to control said stretching of the workpiece.

12. In a combined bending and stretching machine, a frame having a guideway thereon, a carriage movable along said guideway, a table rotatably mounted on said carriage, a chuck on said table for gripping one end of an elongated workpiece, a second chuck mounted on said frame at one end of said guideway and adapted to grip the workpiece at a point spaced from the first chuck, a bending die mounted on said table and about which said workpiece is adapted to be wrapped to cause bending and stretching of the workpiece during the longitudinal movement of the carriage and the rotary movement of the table, a rack extending substantially in the direction of said guideway, a gear connected with said table and meshing with said rack for imparting the rotary movement to the table during said longitudinal movement of the carriage, means mounting said rack for endwise movement on said frame for varying the rotary movement of said table so as to control said stretching of the workpiece, a power cylinder on said frame at one end of said guideway and operably connected with said carriage for imparting movement thereto, and a second power cylinder on said frame and operably connected with said rack.

13. In a combined bending and stretching machine, a frame, a first chuck on said frame at a relatively fixed location thereon and adapted to grip an elongated workpiece at a point spaced from its forward end, a die support, a carriage movable longitudinally of said frame and mounting said die support for rotary movement and for translatory movement toward said first chuck, a second chuck on said die support adapted to grip the workpiece adjacent its forward end, a die on said die support and about which a portion of the workpiece intermediate said chucks is adapted to be wrapped during said rotary and translatory movement to cause bending and stretching of the workpiece, means for producing a continuous rotary movement of the die support during a continuous longitudinal movement of said carriage, power means for producing such longitudinal movement of the carriage, and pivotal mounting means for said first chuck permitting swinging thereof for self-alignment with the workpiece substantially tangentially of said bending die, said first chuck being effective to substantially anchor said workpiece at the gripped point thereof to permit said stretching of the workpiece by the wrapping thereof on said die.

14. In a combined bending and stretching machine, a frame, a first chuck on said frame at a relatively fixed location thereon and adapted to grip an elongated workpiece at a point spaced from its forward end, a die support, a carriage movable longitudinally of said frame and mounting said die support for rotary movement and for translatory movement toward said first chuck, a second chuck on said die support adapted to grip the workpiece adjacent its forward end, a die on said die support and about which a portion of the workpiece intermediate said chucks is adapted to be wrapped during said rotary and translatory movement to cause bending and stretching of the workpiece, means for producing a continuous rotary movement of the die support during a continuous longitudinal movement of said carriage, power means for imparting such longitudinal movement to said carriage, and means mounting said first chuck so as to be rotatable substantially about the longitudinal axis of the workpiece and to be also capable of lateral swinging for self-alignment with the workpiece substantially tangentially of said bending die, said first chuck being effective to substantially anchor said workpiece at the gripped point thereof to permit said stretching of the workpiece by the wrapping thereof on said die.

15. In a bending machine, a frame, a first chuck adapted to grip and substantially anchor an elongated workpiece so that an end of the workpiece projects from said first chuck, a die support, a carriage reciprocably movable longitudinally of said frame and mounting said die support on said frame for rotary movement and also for longitudinal movement toward and away from said first chuck, a second chuck on said die support and adapted to grip the projecting end of said workpiece, a bending die on said die support adapted to cause bending of the projecting end of said workpiece by wrapping of the workpiece around said die during said rotary and longitudinal movement, meshing gear members connected with said frame and die support and having rolling cooperation adapted to cause a continuous rotary movement of the die support during a continuous longitudinal movement of said carriage, means for imparting said longitudinal movement to said carriage, and means mounting said first chuck on said frame so as to permit swinging of said first chuck during bending of the workpiece by said bending die, said bending die having a bend-forming portion extending beyond the common pitch line of said meshing gear members and adapted to cause stretching of said workpiece during the bending thereof.

16. In a bending machine, a frame, a first chuck on said frame at a relatively fixed location thereon and adapted to grip and substantially anchor an elongated workpiece so that an end of the workpiece projects from said first chuck, a die support, a carriage movable longitudinally of said frame and mounting said die support on said frame for rotary movement and also for longitudinal movement toward and away from said first chuck, a second chuck on said die support and adapted to grip the projecting end of said workpiece, a bending die on said die support adapted to cause bending of the projecting end of said workpiece by wrapping of the workpiece around said die during said rotary and longitudinal movement, meshing gear members connected with said frame and die support and having rolling cooperation adapted to cause a continuous rotary movement of the die support during a continuous longitudinal movement of said carriage, means for imparting said longitudinal movement to the carriage, and means mounting said first chuck on said frame so as to permit both lateral swinging and rotation of said first chuck about its axis during bending of the workpiece by said bending die, said bending die having a bend-forming portion extending beyond the common pitch line of said meshing gear members and adapted to cause stretching of said workpiece during the bending thereof.

17. In a bending machine, a frame, a first chuck on said frame at a relatively fixed location thereon and adapted to grip and substantially anchor an elongated workpiece so that an end of the workpiece projects from said first chuck, a die support, a carriage movable longitudinally of said frame and mounting said die support on said frame for rotary movement and also for longitudinal movement toward and away from said first chuck, a second chuck on said die support and adapted to grip the projecting end of said workpiece, a bending die on said die support and around which the projecting end of said workpiece is adapted to be wrapped during said rotary and longitudinal movement for bending and stretching the workpiece, meshing gear members connected with said frame and die support and having rolling cooperation adapted to cause a continuous rotary movement of the die support during a continuous longitudinal movement of said carriage, a head mounted on said frame for lateral swinging, and a spindle rotatable in said head and having said first chuck mounted thereon, said bending die having a bend-forming portion extending beyond the common pitch line of said meshing gear members and adapted to cause said stretching of the workpiece during said bending thereof.

18. In a combined bending and stretching machine, a frame, a first chuck on said frame at a relatively fixed location thereon and adapted to grip and substantially anchor an elongated workpiece so that an end of the workpiece projects from said first chuck, a die support, a carriage reciprocably movable longitudinally of said frame and mounting said die support on said frame for rotary movement and also for longitudinal movement toward and away from said first chuck, a second chuck on said die support and adapted to grip the projecting end of said workpiece, a bending die on said die support and around which the projecting end of said workpiece is adapted to be wrapped during said rotary and longitudinal movement for bending and stretching the workpiece, meshing gear members connected with said frame and die support and having rolling cooperation adapted to cause a continuous rotary movement of the die support during a continuous longitudinal movement of said carriage, power means for imparting such longitudinal movement to said carriage, a head having an opening therethrough and being mounted on said frame for lateral swinging, a sleeve adjustable longitudinally in said opening and adapted to be locked in a desired position of longitudinal adjustment, and a spindle rotatable in said sleeve and on which said first chuck is mounted, said bending die having a bend-forming portion extending beyond the common pitch line of said meshing gear members and adapted to cause said stretching of the workpiece during said bending thereof.

19. In a combined bending and stretching machine, a frame, a first chuck on said frame at a relatively fixed location thereon and adapted to grip an elongated workpiece at a point spaced from its forward end, a die support, means mounting said die support for rotary movement and for translatory movement toward said first chuck, a second chuck on said die support adapted to grip the workpiece adjacent its forward end, a die on said die support and about which a portion of the workpiece intermediate said chucks is adapted to be wrapped during said rotary and translatory movement to cause bending and stretching of the workpiece, means for producing said rotary and translatory movement of the die support, and a second bending die mounted in substantially fixed relation on said frame and located to be engaged by and bend a portion of said workpiece during the final part of said rotary and translatory movement, said first chuck being effective to substantially anchor said workpiece at the gripped point thereof to permit said stretching of the workpiece by the wrapping thereof on said die.

20. In a combined bending and stretching machine, a frame, a first chuck on said frame adapted to grip and substantially anchor an elongated workpiece at a point spaced from its forward end, a die support, means mounting said die support for rotary movement and for translatory movement toward said first chuck, a second chuck on said die support adapted to grip the workpiece adjacent its forward end, a first bending die on said die support and about which a portion of the workpiece intermediate said chucks is adapted to be wrapped during said rotary and translatory movement to cause bending and stretching of the workpiece, means for producing said rotary and translatory movement of the die support including meshing gear members having rolling cooperation and connected respectively with said frame and die support, pivotal mounting means for said first chuck, permitting lateral swinging thereof during said rotary and translatory movement, and a second bending die mounted on said frame in relatively fixed relation and located to be engaged by and bend a portion of said workpiece during the final part of said rotary and translatory movement, said first bending die having a bend-forming portion extending beyond the common pitch line of said meshing gear members and adapted to cause said stretching of the workpiece during the bending thereof.

21. In a combined bending and stretching machine, a frame having a guideway thereon, a carriage movable along said guideway, a table rotatably mounted on said carriage, a chuck on said table for gripping one end of an elongated workpiece, a second chuck mounted on said frame at one end of said guideway and adapted to grip the workpiece at a point spaced from the first chuck, a bending die mounted on said table and about which said workpiece is adapted to be wrapped to cause bending and stretching of the workpiece during the longitudinal movement of the carriage and the rotary movement of the table, a rack extending substantially in the direction of said guideway, a gear connected with said table and meshing with said rack for imparting the rotary movement to the table during the longitudinal movement of the carriage, means mounting said rack for endwise movement on said frame for varying the rotary movement of said table so as to control said stretching of the workpiece, a power cylinder on said frame at one end of said guideway and operably connected with said carriage for imparting movement thereto, a second power cylinder on said frame and operably connected with said rack, and a second bending die mounted on said frame and located adjacent said second chuck so as to cause bending of an intermediate portion of the workpiece.

22. In a combined bending and stretching machine, a frame having a guideway thereon, a carriage movable along said guideway, a table rotatably mounted on said carriage, a chuck on said table for gripping one end of an elongated workpiece, a second chuck mounted on said frame at one end of said guideway and adapted to grip the workpiece at a point spaced from the first chuck, a bending die mounted on said table and about which said workpiece is adapted to be wrapped to cause bending and stretching of the workpiece during the longitudilnal movement of the carriage and the rotary movement of the table, a rack extending substantially in the direction of said guideway, a gear connected with said table and meshing with said rack for imparting the rotary movement to the table during the longitudinal movement of the carriage, means mounting said rack for endwise movement on said frame for varying the rotary movement of said table so as to control said stretching of the workpiece, a power cylinder on said frame at one end of said guideway and operably connected with said carriage for imparting the longitudinal movement thereto, a second power cylinder on said frame and operably connected with said rack, a second die support mounted on said frame, and a second bending die carried by said second die support and adapted to be engaged by an intermediate portion of the workpiece for causing bending of said intermediate portion during the final part of the rotary and longitudinal movement of the first die support.

23. In a combined bending and stretching machine, a frame, a die support, a chuck on said die support for gripping one end of an elongated workpiece, a second chuck mounted on said frame and adapted to grip the workpiece at a point spaced from said one end, means mounting said die support on said frame so as to be capable of rotary movement and also longitudinal movement toward and away from said second chuck, a bending die on said support and about which said workpiece is adapted to be wrapped during said rotary and longitudinal movement to cause bending and stretching of the workpiece, a pair of meshing gear members adapted to cause the rotary movement of said die support during said longitudinal movement, one of said gear members being connected with said die support and the other being a rack mounted on said frame for endwise movement substantially in the direction of said longitudinal movement of the die support, a power device operable to impart said longitudinal movement to the die support, a power device operable to impart said endwise movement to said rack for varying the rotary movement of the die support so as to control said stretching of the workpiece, and manually operable controls associated with the respective power devices for individually controlling the same.

24. In a combined bending and stretching machine, a frame having a guideway thereon, a carriage movable along said guideway, a table rotatably mounted on said carriage, a chuck on said table for gripping one end of an elongated workpiece, a second chuck mounted on said frame at one end of said guideway and adapted to grip the workpiece at a point spaced from the first chuck, a bending die mounted on said table and about which said workpiece is adapted to be wrapped to cause bending and stretching of the workpiece during the longitudinal movement of the carriage and the rotary movement of the table, a rack extending substantially in the direction of said guideway, a gear connected with said table and meshing with said rack for imparting the rotary movement to the table during the longitudinal movement of the carriage, means mounting said rack for endwise movement on said frame for varying the rotary movement of said table so as to control said stretching of the workpiece, a power cylinder on said frame at one end of said guideway and operably connected with said carriage for imparting movement thereto, a second power cylinder on said frame and operably connected with said rack, a source of pressure fluid for operating said power cylinders, and control valves associated with the respective power cylinders for individually controlling the same.

25. A combined bending and stretching machine comprising a frame having a guideway thereon and a fixed table at one end of said guideway, a carriage movable along said guideway, a rotary table in substantially horizontal alignment with said fixed table, means mounting said rotary table on said carriage, means on said rotary table adapted to grip one end of elongated workpiece to be bent, means on said fixed table adapted to grip the other end of the workpiece, a die on said rotary table and about which the intermediate portion of the workpiece is adapted to be wrapped for bending the workpiece to a desired shape, meshing gear members adapted to cause the rotary movement of the rotary table during the longitudinal movement of said carriage, one of said gear members being a rack mounted on said frame for endwise movement substantially in the direction of said guideway for accelerating or retarding said rotary movement of the rotary table to control the stretching of the workpiece, and power devices operably connected with said rack and carriage for imparting movement thereto.

LEE B. GREEN.

REFERENCES CITED

The following references are of record in the file of this patent:

UNITED STATES PATENTS

| Number | Name | Date |
|---|---|---|
| 904,563 | Rau | Nov. 23, 1908 |
| 2,022,915 | Jensen | Dec. 3, 1935 |
| 2,182,626 | Fischer | Dec. 5, 1939 |
| 2,266,912 | Shaw | Dec. 23, 1941 |
| 2,292,731 | Amiot | Aug. 11, 1942 |
| 2,310,259 | Ruppel | Feb. 9, 1943 |
| 2,357,812 | Duer | Sept. 12, 1944 |
| 2,370,329 | Siefried | Feb. 27, 1945 |
| 2,393,140 | Bugg | Jan. 15, 1946 |
| 2,402,273 | Bogart | June 18, 1946 |
| 2,411,801 | Nielsen | Nov. 26, 1946 |
| 2,444,719 | Bath | July 6, 1948 |
| 2,446,089 | Hochreiter | July 27, 1948 |